(12) United States Patent
Hogan et al.

(10) Patent No.: US 7,370,850 B2
(45) Date of Patent: May 13, 2008

(54) AIR SPRING ASSEMBLY

(75) Inventors: Robert R. Hogan, Waterford, MI (US); Yunjun Li, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 301 days.

(21) Appl. No.: 11/341,127

(22) Filed: Jan. 27, 2006

(65) Prior Publication Data

US 2007/0176336 A1   Aug. 2, 2007

(51) Int. Cl.
*F16F 9/43* (2006.01)
(52) U.S. Cl. .................. 267/64.23; 267/64.27
(58) Field of Classification Search .. 267/64.21–64.27, 267/120; 188/300; 24/293–297
See application file for complete search history.

(56) References Cited

U.S. PATENT DOCUMENTS

| 2,056,106 | A | * | 9/1936 | Kuhn | 267/35 |
|---|---|---|---|---|---|
| 2,192,355 | A | * | 3/1940 | Kuhn | 267/35 |
| 3,239,988 | A | * | 3/1966 | Meyer | 52/718.04 |
| 3,445,979 | A | * | 5/1969 | Meyer | 52/718.04 |
| 4,011,635 | A | * | 3/1977 | Meyer | 24/293 |
| 4,294,324 | A | * | 10/1981 | Kimball et al. | 180/89.14 |
| 7,175,165 | B1 | * | 2/2007 | Brake et al. | 267/64.24 |
| 2001/0002739 | A1 | * | 6/2001 | Okamoto | 267/64.12 |
| 2006/0086747 | A1 | * | 4/2006 | Dagn | 220/795 |

* cited by examiner

*Primary Examiner*—Chris Schwartz

(57) ABSTRACT

An air spring assembly for a vehicle includes a spring seat adapted to be secured to vehicle structure of the vehicle. The spring seat has a post extending therefrom. The air spring assembly includes an inflatable air spring having a mounting cap for attachment to the spring seat. The mounting cap has a cavity extending therein to receive the post. The air spring assembly further includes a retaining member extending through the mounting cap and over the post to prevent the post from exiting the cavity to attach the mounting cap to the spring seat.

20 Claims, 2 Drawing Sheets

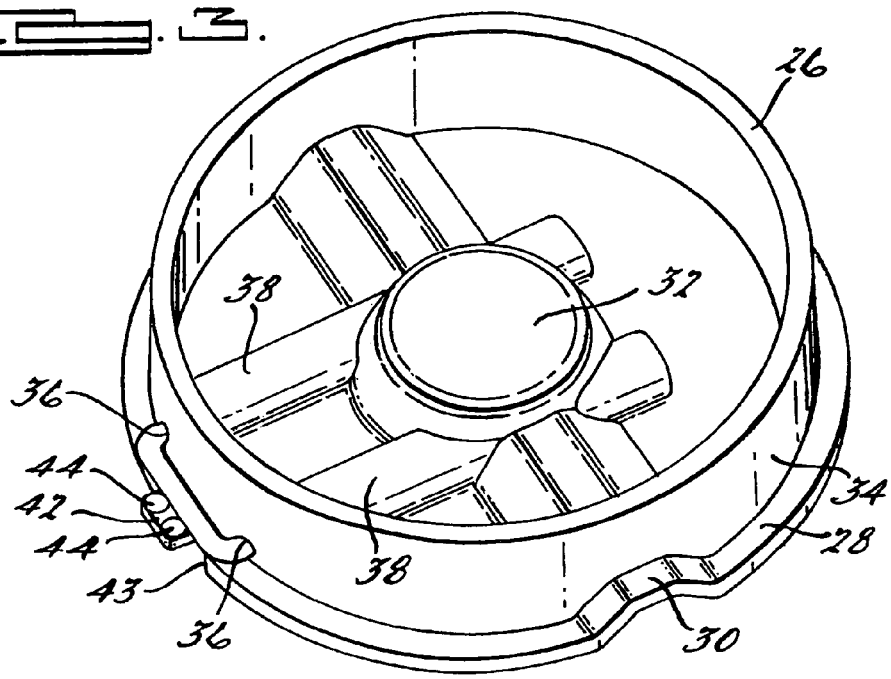
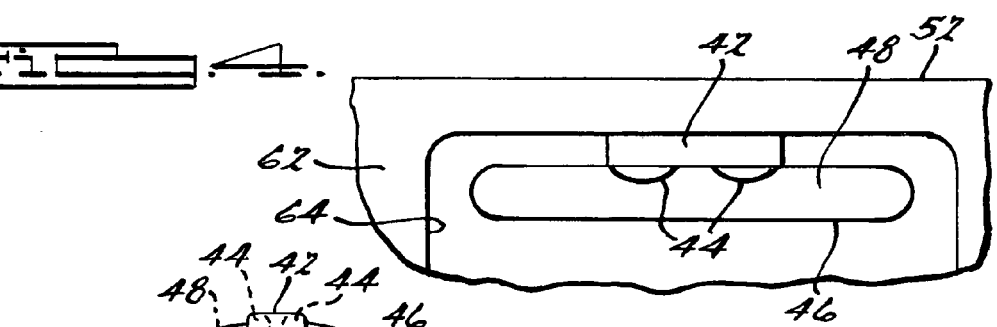
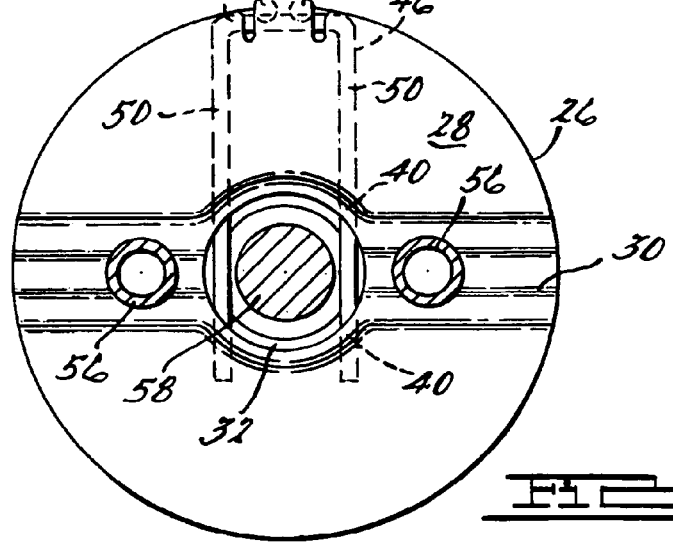

AIR SPRING ASSEMBLY

TECHNICAL FIELD

The present invention relates generally to air springs for vehicles and, more particularly, to an air spring assembly for a vehicle.

BACKGROUND OF THE INVENTION

It is known to provide an air spring assembly for a vehicle between a chassis frame or body rail (on a unibody vehicle) and axle or lower control arm thereof. Typically, the air spring assembly includes an inflatable air spring diaphragm with a lower end fastened to the axle and an upper end fastened to the frame of the vehicle. Generally, fasteners such as bolts, clips, split pins, rivets, or nuts are used to fasten the air spring assembly to the axle and the frame. However, for some applications, there is not enough hand and tool clearance to tighten the fasteners.

As a result, it is desirable to provide an air spring assembly for a vehicle that is easy to install. It is also desirable to provide an air spring assembly for a vehicle that eliminates the need for separate fasteners. It is further desirable to provide an air spring assembly for a vehicle that has a low cost and simple mounting feature. Therefore, there is a need in the art to provide an air spring assembly for a vehicle that meets at least one of these desires.

SUMMARY OF THE INVENTION

Accordingly, the present invention is an air spring assembly for a vehicle. The air spring assembly includes a spring seat adapted to be secured to vehicle structure of a vehicle. The spring seat has a post extending therefrom. The air spring assembly includes an inflatable air spring having a mounting cap for attachment to the spring seat. The mounting cap has a cavity extending therein to receive the post. The air spring assembly further includes a retaining member extending through the mounting cap and over the post to prevent the post from exiting the cavity to attach the mounting cap to the spring seat.

One advantage of the present invention is that an air spring assembly is provided for a vehicle having a low cost, simple mounting feature. Another advantage of the present invention is that the air spring assembly requires no special tool for assembly and service. Still another advantage of the present invention is that the air spring assembly has a self-aligning feature guiding the air spring to the spring seat. A further advantage of the present invention is that the air spring assembly allows a jounce bumper for a coil spring to be mounted to a washer which holds a U-pin and air spring. Still a further advantage of the present invention is that the air spring assembly has a positive holding to prevent the air spring from falling off the spring seat when the air spring is empty. Another advantage of the present invention is that the air spring assembly allows the air spring to have an internal jounce bumper which enables the air suspension to share suspension architecture with a coil spring suspension. Yet another advantage of the present invention is that the air spring assembly requires no threaded fasteners. Still another advantage of the present invention is that the air spring assembly has a self-retention feature that holds the U-pin in place.

Other features and advantages of the present invention will be readily appreciated, as the same becomes better understood, after reading the subsequent description taken in conjunction with the accompanying drawings.

BRIEF DESCRIPTION OF THE DRAWINGS

FIG. 3 is a perspective view of a portion of the air spring assembly of FIG. 1.

FIG. 4 is a partial elevational view of a portion of the air spring assembly of FIG. 1.

FIG. 5 is a sectional view taken along line 5-5 of FIG. 2.

DESCRIPTION OF THE PREFERRED EMBODIMENT

Figure 1:
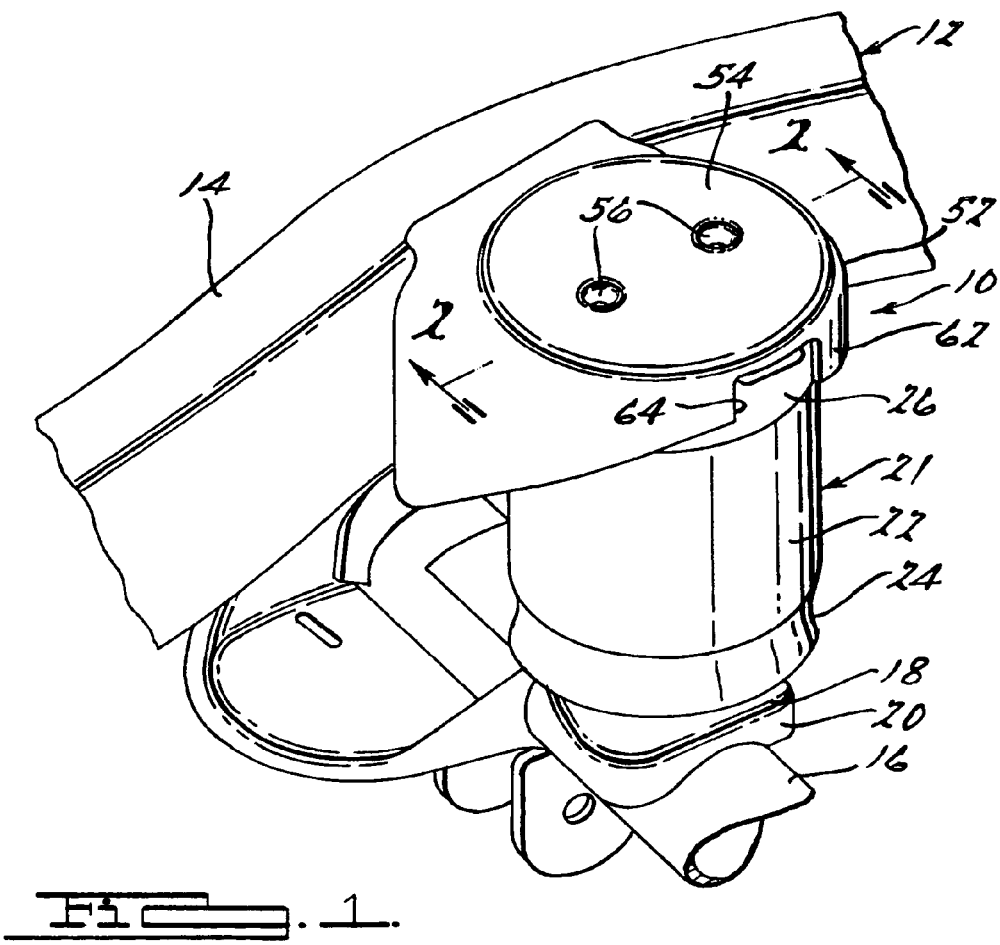
FIG. 1 is a perspective view of an air spring assembly, according to the present invention, illustrated in operational relationship with a vehicle.
Figure 2:
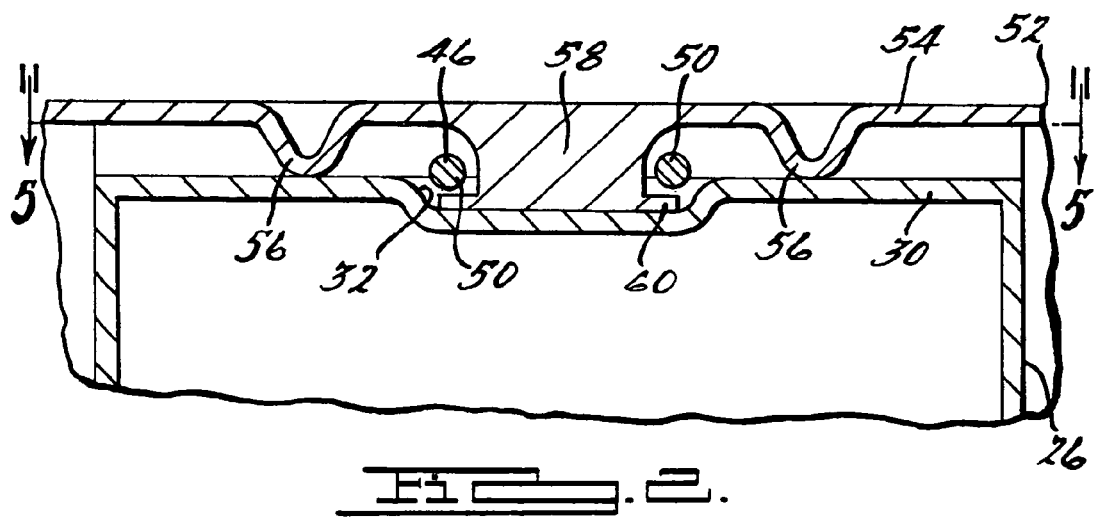
FIG. 2 is a sectional view taken along line 2-2 of FIG. 1.

Referring to the drawings and in particular FIG. 1, one embodiment of an air spring assembly 10, according to the present invention, is shown for a vehicle (partly shown), such as a pick-up truck, sport utility vehicle, or car, generally indicated at 12. Such vehicles 12 typically include a frame 14 (partially shown) and an axle 16. It should be appreciated that the air spring assembly 10 is mounted between the axle 16 and frame 14 to support a vehicle body (not shown). It should also be appreciated that the air spring assembly 10 may be mounted between the frame 14 and a lower control arm (not shown) of the vehicle.

In the embodiment illustrated, the air spring assembly 10 includes a lower spring seat 18 disposed on the axle 16. The lower spring seat 18 is generally circular in shape. The lower spring seat 18 includes at least one flange 20 extending downwardly thereto. The lower spring seat 18 is secured to the axle 16 by a suitable mechanism such as welding or fasteners (not shown) or be formed as part of the axle 16. It should be appreciated that, in another embodiment, the lower spring seat 18 is secured to the lower control arm (not shown) by a suitable mechanism such as welding or fasteners (not shown) or be formed as part of the lower control arm.

The air spring assembly 10 includes an air spring, generally indicated at 21, disposed between the lower spring seat 18 and an upper spring seat 52 to be described. The air spring 21 includes an inflatable air spring diaphragm 22 extending vertically. The air spring diaphragm 22 is generally cylindrical in shape and has a generally circular shaped cross-section. The air spring 21 also includes a lower mounting cap 24 at a lower end of the diaphragm 22 and attached to the lower spring seat 18 by a suitable mechanism (not shown). The lower mounting cap 24 is generally circular in shape and the diaphragm 22 rolls on the lower mounting cap 24. It should be appreciated that the lower mounting cap 24 could be contoured to meet air spring rates for a comfort ride. It should also be appreciated that the lower mounting cap 24 may have a feature (not shown) to be attached to the lower spring seat 18 to be removably attached thereto.

The air spring 21 further includes an upper mounting cap 26 at an upper end of the diaphragm 22. The upper mounting cap 26 has a base wall 28 that mates with an upper spring seat 52 to be described. The base wall 28 includes a channel 30 formed therein extending radially across and axially inward. The base wall 28 includes a cavity 32 extending therein. The cavity 32 is generally circular in cross-sectional shape and is located approximately in the center of the base wall 28. It should be appreciated that the channel 30 communicates with the cavity 32.

The upper mounting cap 26 also has a side wall 34 located inwardly from the edge of the base wall 28. The side wall 34 is annular and extends generally perpendicular to the base wall 28. The side wall 34 has at least one, preferably a plurality of, such as two, apertures 36 spaced circumferentially and extending radially therethrough for a function to be described.

The upper mounting cap 26 has at least one, preferably a plurality of, such as two, channel members 38 extending from the side wall 34 and along the base wall 28. The channel members 38 are aligned with the apertures 36 in the side wall 34. The channel members 38 are arcuately shaped in cross-section and extend radially along the inside of the base wall 28 to the cavity 32 and extend radially beyond the cavity 32 for a function to be described. The channel members 38 are orientated generally perpendicular to the channel 30. It should be appreciated that the channel members 38 have passages (not shown) extending therein with openings 40 to communicate with the cavity 32.

The upper mounting cap 26 further has a tab 42 extending radially from the base wall 28. The tab 42 is generally rectangular in shape and is located in a recess 43 in the periphery of the base wall 28. The tab 42 is disposed above and circumferentially between the apertures 36 in the side wall 34. The tab 42 has at least one, preferably a plurality of, such as two, projections 44 extending generally perpendicularly therefrom. The projections 44 are generally hemispherical in shape for a function to be described.

The upper mounting cap 26 is made of a rigid material such as metal or plastic. The upper mounting cap 26 is a monolithic structure being integral, unitary, and one-piece.

The air spring assembly 10 includes a retaining member 46 to retain the upper mounting cap 26 to an upper spring seat 52 to be described. The retaining member 46 is generally "U" shaped and is a non-threaded U-pin. The retaining member 46 has a base portion 48 extending laterally and a pair of opposed side portions 50 extending generally perpendicularly from the ends of the base portion 48 to form a general "U" shape. The base portion 48 and side portions 50 have a generally circular cross-sectional shape. The retaining member 46 is made of a rigid material such as metal. The retaining member 46 is a monolithic structure being integral, unitary, and one-piece.

The air spring assembly 10 further includes an upper spring seat 52 connected to the frame 14. The upper spring seat 52 has a top wall 54 that is generally planar and mates with the upper mounting cap 26. The top wall 54 has at least one, preferably a plurality of, such as two, projections or keys 56 spaced radially and extending toward the air spring 21 for a function to be described. The upper spring seat 52 has a post 58 extending generally perpendicularly to the top wall 54. The post 58 is generally cylindrical in shape and has a generally circular cross-sectional shape. The post 58 is located radially between the projections 56 and spaced therefrom. The post 58 has a flange 60 extending radially outwardly from a free end thereof for a function to be described. The flange 60 may be a washer welded to the post 58 or be integral, unitary, and one-piece with the post 58. It should be appreciated that the projections 56 orientate the air spring 21 to a predefined orientation and hold or guide a coil spring (not shown). It should also be appreciated that the flange 60 will hold the retaining member 46 and also a jounce bumper (not shown) for the coil spring when the jounce bumper is inside of the coil spring.

The upper spring seat 52 has a side wall or flange 62 extending downwardly and generally perpendicular thereto. The side wall 62 has a slot 64 therein for allowing access to the apertures 36 in the upper mounting cap 26. The slot 64 is generally rectangular in shape. The upper spring seat 52 is connected to the frame 12 by a suitable mechanism such as welding or fasteners (not shown). The upper spring seat 52 is made of a rigid material, preferably a metal material. The upper spring seat 52 is a monolithic structure being integral, unitary, and one-piece. It should be appreciated that lower mounting cap 24 of the air spring 21 may be configured similar to the upper mounting cap 26 and that the lower spring seat 18 may be configured similar to the upper spring seat 52 such that the lower mounting cap 24 could be retained with the retaining member 46 to the lower spring seat 18.

In operation of the air spring assembly 10, the lower mounting cap 24 of the air spring 21 is attached to the lower spring seat 18. The upper mounting cap 26 is attached to the upper spring seat 52 by locating the post 58 in the cavity 32. The projections 56 are disposed in the channel 30 and orientate the air spring 21. The retaining member 46 is slid through the apertures 36 and channel members 38 in the upper mounting cap 26 until the side portions 50 of the retaining member 46 passes over the cavity 32 and into the channel members 38 again on the opposite side of the cavity 32 which traps the post 58. The base portion 48 of the retaining member 46 is pushed over the projections 44 of the tab 42, which flexes and acts to self-retain the retaining member 46. At this point, the tab 42 springs back and locks the air spring 21 in place. To remove the air spring 21, the air spring diaphragm 22 is deflated and the tab 42 is depressed. The retaining member 46 is removed from the channel members 38 of the upper mounting cap 26 and the upper mounting cap 26 is moved in a direction opposite to insertion to remove to the post 58 and projections 56 from the cavity 32, channel 30, and the upper spring seat 52. It should be appreciated that the operation may be repeated to re-assemble the air spring 21 to the seats 18 and 52. It should also be appreciated that the channel members 38 are not open to an inner air chamber of the air spring 21, which accomplishes a secure air tight locking mechanism with no threaded fasteners and can be used in a blind environment.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. An air spring assembly for a vehicle comprising:
   a spring seat adapted to be secured to vehicle structure of a vehicle, said spring seat having a post extending therefrom;
   an inflatable air spring having a mounting cap for attachment to said spring seat, said mounting cap having a cavity extending therein to receive said post; and
   a retaining member extending through said mounting cap and over said post to prevent said post from exiting said cavity to attach said mounting cap to said spring seat.

2. An air spring assembly as set forth in claim 1 wherein said retaining member has a general "U" shape.

3. An air spring assembly as set forth in claim 1 wherein said mounting cap has a channel extending therein and radially thereacross, said cavity being located centrally in said channel.

4. An air spring assembly as set forth in claim 3 wherein said mounting cap has a plurality of channel members extending generally perpendicularly to said channel and communicating with said cavity.

5. An air spring assembly as set forth in claim 3 wherein said mounting cap comprises a base wall and an annular side wall extending from said base wall, said channel being formed in said base wall.

6. An air spring assembly as set forth in claim 5 wherein said base wall has a recess in a periphery thereof and a tab extending into said recess to cooperate with said retaining member to lock said retaining member in a locked position.

7. An air spring assembly as set forth in claim 6 wherein said tab includes a plurality of projections extending therefrom.

8. An air spring assembly as set forth in claim 1 wherein said spring seat includes a plurality of projections extending therefrom and spaced from said post to orientate said air spring relative to said spring seat.

9. An air spring assembly as set forth in claim 1 wherein said post has a flange extending radially outwardly at a free end thereof.

10. An air spring assembly as set forth in claim 1 wherein said mounting cap includes a plurality of apertures extending therein to receive said retaining member.

11. An air spring assembly for a vehicle comprising:
a lower spring seat adapted to be secured to either on of an axle and lower control arm of a vehicle;
an upper spring seat adapted to be secured to a frame of the vehicle;
at least one of said upper spring seat and said lower spring seat having a post extending therefrom;
an air spring having an inflatable diaphragm with a mounting cap for attachment to either one of said lower spring seat and said upper spring seat, said mounting cap having a cavity extending therein to receive said post; and
a non-threaded retaining member extending through said mounting cap and over said post to prevent said post from exiting said cavity.

12. An air spring assembly as set forth in claim 11 wherein said retaining member has a general "U" shape.

13. An air spring assembly as set forth in claim 11 wherein said mounting cap has a channel extending therein and radially thereacross, said cavity being located centrally in said channel.

14. An air spring assembly as set forth in claim 13 wherein said mounting cap has a plurality of channel members extending generally perpendicularly to said channel and communicating with said cavity.

15. An air spring assembly as set forth in claim 14 wherein said mounting cap includes a plurality of apertures extending therein and aligned with said channel members.

16. An air spring assembly as set forth in claim 13 wherein said mounting cap comprises a base wall and an annular side wall extending from said base wall, said channel being formed in said base wall.

17. An air spring assembly as set forth in claim 16 wherein said base wall has a recess in a periphery thereof and a tab extending into said recess to cooperate with said retaining member to lock said retaining member in a locked position.

18. An air spring assembly as set forth in claim 17 wherein said tab includes a plurality of projections extending therefrom.

19. An air spring assembly as set forth in claim 11 wherein said post has a flange extending radially outwardly at a free end thereof.

20. An air spring assembly for a vehicle comprising:
a lower spring seat adapted to be secured to either one of an axle and lower control arm of a vehicle;
an upper spring seat adapted to be secured to a frame of the vehicle, said upper spring seat having a post extending therefrom with a flange extending radially outwardly at a free end thereof;
an air spring having an inflatable diaphragm, a lower mounting cap for attachment to said lower spring seat and an upper mounting cap for attachment to said upper spring seat;
at least one of said lower mounting cap and said upper mounting cap comprising a base wall and an annular side wall extending from said base wall, said base wall having a cavity extending therein to receive said post and a channel being formed in said base wall and communicating with said cavity, a plurality of channel members extending generally perpendicularly to said channel and communicating with said cavity, a plurality of apertures extending through said side wall and aligned with said channel members, said base wall having a recess in a periphery thereof and a tab extending into said recess having a plurality of projections extending therefrom; and
a non-threaded and U-shaped retaining member extending through said mounting cap and over said post to prevent said post from exiting said cavity.

* * * * *